(12) United States Patent
Ernest et al.

(10) Patent No.: US 7,668,741 B2
(45) Date of Patent: Feb. 23, 2010

(54) MANAGING COMPLIANCE WITH SERVICE LEVEL AGREEMENTS IN A GRID ENVIRONMENT

(75) Inventors: Leslie Mark Ernest, Knoxville, MD (US); Rick Allen Hamilton, II, Charlottesville, VA (US); William Louis Moraca, Jr., McLean, VA (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 11/031,403

(22) Filed: Jan. 6, 2005

(65) Prior Publication Data

US 2006/0149576 A1 Jul. 6, 2006

(51) Int. Cl.
G06F 9/44 (2006.01)

(52) U.S. Cl. .................... 705/7; 705/1; 718/104
(58) Field of Classification Search ........... None
See application file for complete search history.

(56) References Cited

U.S. PATENT DOCUMENTS

| | | | |
|---|---|---|---|
| 4,591,980 A | 5/1986 | Huberman et al. ........... 712/16 |
| 5,220,674 A | 6/1993 | Morgan et al. | |
| 5,325,525 A | 6/1994 | Shan et al. ........... 718/104 |
| 5,630,156 A | 5/1997 | Privat et al. ........... 712/14 |
| 5,640,569 A * | 6/1997 | Miller et al. ........... 710/241 |
| 5,729,472 A | 3/1998 | Seiffert et al. | |
| 5,884,046 A | 3/1999 | Antonov | |
| 5,905,975 A | 5/1999 | Ausubel | |
| 5,931,911 A | 8/1999 | Remy et al. ........... 709/223 |
| 5,978,583 A | 11/1999 | Ekanadham et al. ........ 717/106 |

(Continued)

FOREIGN PATENT DOCUMENTS

EP 0790559 A 8/1997
EP 1267552 A 12/2002

OTHER PUBLICATIONS

Al-Theneyan, Ahmed Hamdan, "A Policy-Based Resource Brokering Environment for Computational Grids" (2002) Ph.D. dissertation, Old Dominion University, United States—Virginia.*

(Continued)

*Primary Examiner*—Bradley B Bayat
*Assistant Examiner*—Gurkanwaljit Singh
(74) *Attorney, Agent, or Firm*—William H. Steinberg; Amy J. Pattillo

(57) ABSTRACT

A computer-implemented method, system, and program for managing compliance with service level agreements in a grid environment are provided. A grid service for managing compliance with service level agreements in a grid environment detects a grid job passing a timing entry point, and flowing towards a grid environment provided by a grid vendor. When the grid job is detected passing the timing entry point, the grid service starts a timer to monitor an amount of time from the grid job passing the timing entry point until a result of the grid job passes a timing exit point while flowing away from the grid environment. When the grid service detects the result of the grid job passing the timing exit point, the grid service determines whether a value of the timer exceeds a timing term agreed to in a service level agreement specifying performance requirements for said grid job agreed to by said grid vendor, such that compliance with the service level agreement is automatically managed within the grid environment.

15 Claims, 7 Drawing Sheets

U.S. PATENT DOCUMENTS

| | | | |
|---|---|---|---|
| 6,021,398 | A | 2/2000 | Ausubel |
| 6,049,828 | A | 4/2000 | Dev et al. |
| 6,067,580 | A | 5/2000 | Aman ............... 719/33 |
| 6,119,186 | A | 9/2000 | Watts et al. |
| 6,154,787 | A | 11/2000 | Urevig et al. |
| 6,167,445 | A | 12/2000 | Gai et al. |
| 6,304,892 | B1 | 10/2001 | Bhoj et al. ............... 709/202 |
| 6,310,889 | B1 | 10/2001 | Parsons et al. |
| 6,356,909 | B1 | 3/2002 | Spencer ............... 707/10 |
| 6,430,711 | B1 | 8/2002 | Sekizawa |
| 6,438,704 | B1 | 8/2002 | Harris et al. ............... 713/502 |
| 6,452,692 | B1 | 9/2002 | Yacoub |
| 6,453,376 | B1 | 9/2002 | Fairman et al. ............... 710/240 |
| 6,463,454 | B1 | 10/2002 | Lumelsky et al. |
| 6,470,384 | B1 | 10/2002 | O'Brien et al. |
| 6,552,813 | B2 | 4/2003 | Yacoub |
| 6,560,609 | B1 | 5/2003 | Frey et al. |
| 6,578,160 | B1 | 6/2003 | MacHardy et al. |
| 6,606,602 | B1 | 8/2003 | Kolls |
| 6,625,643 | B1 | 9/2003 | Colby et al. |
| 6,647,373 | B1 | 11/2003 | Carlton-Foss |
| 6,654,759 | B1 | 11/2003 | Brunet et al. |
| 6,654,807 | B2 | 11/2003 | Farber et al. |
| 6,671,676 | B1 | 12/2003 | Shacham ............... 705/37 |
| 6,681,251 | B1 | 1/2004 | Leymann et al. ............... 709/226 |
| 6,701,342 | B1* | 3/2004 | Bartz et al. ............... 709/200 |
| 6,714,987 | B1 | 3/2004 | Amin et al. |
| 6,717,694 | B1 | 4/2004 | Fukunaga et al. |
| 6,748,416 | B2 | 6/2004 | Carpenter et al. ............... 709/202 |
| 6,752,663 | B2 | 6/2004 | Farrell et al. ............... 709/224 |
| 6,816,905 | B1 | 11/2004 | Sheets et al. |
| 6,941,865 | B2 | 9/2005 | Kato |
| 6,954,739 | B1* | 10/2005 | Bouillet et al. ............... 705/63 |
| 6,963,285 | B2 | 11/2005 | Fischer et al. |
| 7,050,184 | B1 | 5/2006 | Miyamoto |
| 7,055,052 | B2 | 5/2006 | Chalasani et al. |
| 7,080,077 | B2 | 7/2006 | Ramamurthy et al. |
| 7,096,248 | B2 | 8/2006 | Masters et al. |
| 7,123,375 | B2 | 10/2006 | Nobutani et al. |
| 7,171,654 | B2 | 1/2007 | Werme et al. |
| 7,181,302 | B2* | 2/2007 | Bayne ............... 700/96 |
| 7,181,743 | B2 | 2/2007 | Werme et al. |
| 7,243,121 | B2 | 7/2007 | Neiman et al. |
| 7,243,147 | B2 | 7/2007 | Hodges et al. |
| 7,245,584 | B2* | 7/2007 | Goringe et al. ............... 370/232 |
| 7,283,935 | B1* | 10/2007 | Pritchard et al. ............... 702/186 |
| 7,340,654 | B2* | 3/2008 | Bigagli et al. ............... 714/47 |
| 7,426,267 | B1* | 9/2008 | Caseau ............... 379/265.02 |
| 7,433,931 | B2 | 10/2008 | Richoux |
| 7,437,675 | B2* | 10/2008 | Casati et al. ............... 715/736 |
| 7,451,106 | B1* | 11/2008 | Gindlesperger ............... 705/37 |
| 7,472,112 | B2 | 12/2008 | Pfeiger et al. |
| 7,533,168 | B1 | 5/2009 | Pabla et al. |
| 7,552,437 | B2* | 6/2009 | Di Luoffo et al. ............... 718/104 |
| 7,562,143 | B2* | 7/2009 | Fellenstein et al. ............... 709/226 |
| 7,584,274 | B2* | 9/2009 | Bond et al. ............... 709/223 |
| 2002/0023168 | A1* | 2/2002 | Bass et al. ............... 709/232 |
| 2002/0057684 | A1 | 5/2002 | Miyamoto et al. ............... 370/386 |
| 2002/0072974 | A1* | 6/2002 | Pugliese et al. ............... 705/14 |
| 2002/0103904 | A1 | 8/2002 | Hay ............... 709/225 |
| 2002/0152305 | A1* | 10/2002 | Jackson et al. ............... 709/224 |
| 2002/0171864 | A1 | 11/2002 | Sesek |
| 2002/0188486 | A1* | 12/2002 | Gil et al. ............... 705/7 |
| 2003/0011809 | A1 | 1/2003 | Suzuki et al. |
| 2003/0036886 | A1 | 2/2003 | Stone |
| 2003/0041010 | A1 | 2/2003 | Yonao-Cowan |
| 2003/0058797 | A1* | 3/2003 | Izmailov et al. ............... 370/238 |
| 2003/0088671 | A1 | 5/2003 | Klinker et al. |
| 2003/0101263 | A1* | 5/2003 | Bouillet et al. ............... 709/225 |
| 2003/0108018 | A1* | 6/2003 | Dujardin et al. ............... 370/338 |
| 2003/0112809 | A1 | 6/2003 | Bharali et al. ............... 370/400 |
| 2003/0126240 | A1 | 7/2003 | Vosseler |
| 2003/0126265 | A1 | 7/2003 | Aziz et al. |
| 2003/0140143 | A1 | 7/2003 | Wolf et al. |
| 2003/0145084 | A1 | 7/2003 | McNerney ............... 709/224 |
| 2003/0161309 | A1* | 8/2003 | Karuppiah ............... 370/392 |
| 2003/0195813 | A1 | 10/2003 | Pallister et al. |
| 2003/0204758 | A1* | 10/2003 | Singh ............... 713/320 |
| 2003/0212782 | A1* | 11/2003 | Canali et al. ............... 709/223 |
| 2004/0064548 | A1* | 4/2004 | Adams et al. ............... 709/224 |
| 2004/0078471 | A1 | 4/2004 | Yang ............... 709/227 |
| 2004/0093381 | A1* | 5/2004 | Hodges et al. ............... 709/204 |
| 2004/0095237 | A1 | 5/2004 | Chet et al. |
| 2004/0098606 | A1 | 5/2004 | Tan et al. |
| 2004/0103339 | A1* | 5/2004 | Chalasani et al. ............... 714/4 |
| 2004/0128186 | A1* | 7/2004 | Breslin et al. ............... 705/10 |
| 2004/0145775 | A1 | 7/2004 | Kubler et al. |
| 2004/0213220 | A1 | 10/2004 | Davis |
| 2004/0215590 | A1 | 10/2004 | Kroening |
| 2004/0225711 | A1 | 11/2004 | Burnett et al. |
| 2005/0021349 | A1 | 1/2005 | Cheliotis et al. |
| 2005/0027691 | A1 | 2/2005 | Brin et al. |
| 2005/0027865 | A1 | 2/2005 | Bozak et al. |
| 2005/0041583 | A1* | 2/2005 | Su et al. ............... 370/235 |
| 2005/0044228 | A1 | 2/2005 | Birkestrand et al. |
| 2005/0065994 | A1 | 3/2005 | Creamer et al. |
| 2005/0108394 | A1 | 5/2005 | Braun et al. |
| 2005/0120160 | A1 | 6/2005 | Plouffe et al. |
| 2005/0138162 | A1 | 6/2005 | Byrnes |
| 2005/0138175 | A1 | 6/2005 | Kumar et al. |
| 2005/0182838 | A1 | 8/2005 | Sheet et al. |
| 2005/0187797 | A1 | 8/2005 | Frost |
| 2005/0234937 | A1* | 10/2005 | Ernest et al. ............... 707/100 |
| 2005/0283788 | A1 | 12/2005 | Bigagli et al. |
| 2006/0047802 | A1* | 3/2006 | Iszlai et al. ............... 709/224 |
| 2006/0064698 | A1 | 3/2006 | Miller et al. |
| 2006/0069621 | A1 | 3/2006 | Chang et al. |
| 2006/0075042 | A1 | 4/2006 | Wang et al. |
| 2006/0149576 | A1* | 7/2006 | Ernest et al. ............... 705/1 |
| 2006/0288251 | A1 | 12/2006 | Jackson |
| 2006/0294238 | A1* | 12/2006 | Naik et al. ............... 709/226 |

OTHER PUBLICATIONS

Leff, Avraham, Rayfield, James T., Dias, Daniel M. "Service-Level Agreements and Commercial Grids." IEEE Internet Computing (Jul.-Aug. 2003): pp. 44-50. Discloses monitoring and enforcing SLAs (p. 48-49).*

Hill, J R. "A Management platform for commercial Web Services." BT Technology Journal (Jan. 2004): vol. 22 No. 1 pp. 52-62) discloses SLA enforcement in grid environment.*

Alexander Keller and Heiko Ludwig, "The WSLA Framework: Specifying and Monitoring Service Level Agreements forWeb Services." Journal of Network and Systems Management, vol. 11, No. 1, Mar. 2003 ( C 2003): p. 57-81.*

Menasce, Daniel A., and Casalicchio, Emiliano "QoS in Grid Computing" IEEE Internet Computing (Jul.-Aug. 2004): pp. 85-87.*

T Boden, "The grid enterprise—structuring the agile business of the future." BT Technology Journal • vol. 22 No. 1 • Jan. 2004: pp. 107-117.*

Foster et al.; The Anatomy of the Grid, Enabling Scalable Virtual Organizations; available at www.globus.org/research/papers/anatomy.pdf as of Nov. 27, 2003.

Foster et al.; The Physiology of the Grid, An Open Grid Services Architecture for Distributed Systems Integration; available at www.globus/org/research/papers/ogsa.pdf as of Nov. 27, 2003.

Foster, Ian; What is the Grid? A Three Point Checklist; available at www-fp.mcs.anl.gov/~foster/Articles/WhatIsTheGrid.pdf as of Nov. 27, 2003.

Ferreira et al.; IBM Redpaper—Globus Toolkit 3.0 Quick Start; available at www.redbooks.ibm.com/redpapers/pdfs/redp369 as of Nov. 27, 2003.

IBM Grid Computing—What is Grid Computing; available at www-1.ibm.com/grid/about_grid/what_is.shtml as of Nov. 27, 2003.

Berstis, Viktors; IBM Redpaper—Fundamentals of Grid Computing; available at www.redbooks.ibm.com/redpapers/pdfs/redp3613.pdf as of Nov. 27, 2003.

Jacob, Bart; IBM Grid Computing—Grid Computing: What are the key components?; available at www-106.ibm.com/developerworks/grid/library/gr-overview/ as of Nov. 27, 2003.

Unger et al.; IBM Grid Computing—A Visual Tour of Open Grid Services Architecture; available at www-106.ibm.com/developerworks/grid/library/gr-visual/ as of Nov. 27, 2003.

Edited by Rajkumar Buyya; Grid Computing Info Centre: Frequently Asked Questions (FAQ); available at http://www.cs.mu.oz.au/~raj/GridInfoware/gridfaq.html as of Nov. 27, 2003.

Akhil Sahai et al., "Specifying and Monitoring Guarantees in Commercial Grids through SLA", reference No. HPL-2002-324, copyright Hewlett-Packard Company 2002, pp. 1-8, available at http://www.hpl.hp.com/techreports/2002/HPL-2002-324.html as of Nov. 14, 2004.

Sven Graupner et al., "Management +=Grid", reference numeral HPL 2003-114, copyright Hewlett-Packard Company 2003, pp. 1-2, available at http://www.hpl.hp.com/techreports/2003/HPL-2003-114.html as of Nov. 14, 2004.

Massie ML et al, "The Ganglia Distributed Monitoring System: Design, Implementation, and Experience" Parallel Computing Elsevier Netherlands, vol. 30, No. 7, Jul. 2004, pp. 817-840.

Fenglian XU et al, "Tools and Support for Deploying Applications on the Grid" Services Computing, 2004. Proceedings 2004 International Conference on Shanghai, China, Sep. 15-18, 2004, Piscataway, NJ, IEEE, pp. 281-287.

Ian Foster and Carl Kesselman, "Grid2—Blueprint for a New Computing Infrastructure" 2004, Elsevier, San Francisco, CA, chapter 20, Instrumentation and Monitoring, pp. 319-343.

Smallen S et al, "The Inca Test Harness and Reporting Framework" Supercomputing 2004. Proceedings of the ACM/IEEE SC2004 Conference Pittsburgh, PA, Nov. 2004, p. 1-10.

Allen G, et al, "The Cactus Worm: Experiments with Dynamic Resource Discovery and Allocation in a Grid Environment", International Journal of High Performance Computing Applications, Sage Science Press, Thousand Oaks, US, vol. 15, No. 4, 2001, pp. 345-358.

Hwa Min Lee, "A Fault Tolerance Service for QoS in Grid Computing", Lecture Notes in Computer Science, vol. 2659, Aug. 2003, pp. 286-296.

Tianyi Zang, et al, "The Design and Implementation of an OGSA-based grid information service" Web Services, 2004. Proceedings IEEE International Conference on San Diego CA, Piscataway, NJ, IEEE, Jul. 6, 2004, pp. 566-573.

Sample N, et al, "Scheduling Under Uncertainty: Planning for the Ubiquitous Grid", Coordination Models and Languages, 5th International Conference, Coordination 2002. Proceedings (Lecture Notes in Computer Science, vol. 2315) Springer-Varlag Berlin, Germany, 2002, pp. 300-316.

Gever DH, et al, "WWW-based high performance computing support of acoustic matched field processing", MTS/IEEE Oceans 2001. An Ocean Odessey. Conference Proceedings (IEEE Cat. No. 01CH37295) Marine Technology Soc. Washington, DC, vol. 4, 2001, pp. 2541-2548.

Chase, JS et al, "Dynamic Virtual Clusters in a Grid Site Manager", High Performance Distributed Computing 2003. Proceedings. 12th IEEE International Symposium, Jun. 22-24, 2003, Piscataway, NJ, USA, IEEE, pp. 90-100.

"Method of Providing On-Demand-Computing for Server Blades", IP.com Journal, IP.com Inc., West Henrietta, NY, US, Sep. 8, 2003, p. 1.

Kubicek, C, et al., "Dynamic Allocation of Servers to Jobs in a Grid Hosting Environment", by Technology Journal, vol. 22, No. 3, Jul. 2004, pp. 251-260.

Yang, Kun, et al, "Network Engineering Towards Efficient Resource On-Demand in Grid Computing", Communication Technology Proceedings, 2003, ICCT 2003, International Conference on Apr. 9-11, 2003, Piscataway, NJ, USA, IEEE, vol. 2, Apr. 9, 2003, pp. 1715-1718.

Ding et al., "An Agent Model for Managing Distributed Software Resources in Grid Environment", 2003, ICCS, LNCS 2658, pp. 971-980.

U.S. Appl. No. 11/031,490, filed Jan. 6, 2005, Fellenstein et al.
U.S. Appl. No. 11/031,541, filed Jan. 6, 2005, Fellenstein et al.
U.S. Appl. No. 11/031,542, filed Jan. 6, 2005, Dawson et al.
U.S. Appl. No. 11/031,543, filed Jan. 6, 2005, Fellenstein et al.
U.S. Appl. No. 11/031,489, filed Jan. 6, 2005, Fellenstein et al.
U.S. Appl. No. 11/031,426, filed Jan. 6, 2005, Gusler et al.
U.S. Appl. No. 11/031,427, filed Jan. 6, 2005, Fellenstein et al.

Rolia, Jerry et al, "Service Centric Computing—Next Generation Internet Computing", 2002, Springer-Verlag Berlin Heidelberg, pp. 463-479.

Belloum, Adam et al, "VLAM-G: a grid-based virtual laboratory", 2002, Future Generation Computer Systems 19, Elsevier Science B.V., pp. 209-217.

Min, D. and Mutka, M., "Efficient Job Scheduling in a Mesh Multicomputer Without Discrimination Against Large Jobs", 1995, IEEE., pp. 52-59.

Notice of Allowance, U.S. Appl. No. 10/868,542, filed Jun. 15, 2004, Mailed Apr. 16, 2009.

Office Action, U.S. Appl. No. 11/031,426, filed Jan. 6, 2005, Mailed Apr. 1, 2009.

Cao et al, GridFlow: Workflow management for grid computing, C&C Res. Labs, NEC Eur Ltd, Germany: This paper appears in : Cluster Computing and Grid, 2003. Proceedings. CCGrid 2003. 3rd IEEE/ACL International Symposium; Publication date: May 12-15, 2003, 8 pages.

"The DataGrid Workload Management System: Challenges and Results", Journal of Grid Computing, Springer Netherlands, ISSN 1570-7873 (Print) 1572-9814 (Online), vol. 2, No. 4, Dec. 2004, pp. 353-367.

USPTO Office Action Response in pending U.S. Appl. No. 11/031,490, filed Jan. 6, 2005, Craig William Fellenstein et al, Mailing date: May 29, 2009, 10 pages.

Office Action, U.S. Appl. No. 11/767,502, filed Jun. 23, 2007, Zhendong Bao, Mailed Jun. 25, 2009, pp. 1-14.

Weng et al, "A cost-based online scheduling algorithm for job assignment on computational grids", Springer-Verlag Berlin Heidelberg, 2003, pp. 343-351.

Andrade et al, "Our grid: An approach to easily assemble grids with equitable resource sharing", Springer-Verlag Berlin Heidelberg, 2003, pp. 61-86.

Chase, JS et al, "Dynamic Virtual Clusters in a Grid Site Manager," High Performance Distributed Computing 2003. Proceedings, 12th IEEE International Symposium, Jun. 22-24, 2003, Piscataway, NJ USA, IEEE, pp. 90-100.

Office Action, U.S. Appl. No. 10/940,452, filed Sep. 14, 2004, Craig Fellenstein, Mailed Jun. 23, 2009, pp. 1-13.

Office Action, U.S. Appl. No. 12/211,243, Filed Sep. 16, 2008, Di Luoffo et al, Mailed Aug. 12, 2009, p. 1-18.

Office Action, U.S. Appl. No. 11/031,542, Filed Jan. 06, 2005, Dawson et al, Mailed Jul. 7, 2009, pp. 1-15.

"IBM Girds for Grids". McConnell, Chris. Enterprise System Journal, Oct. 2001, 1 page.

" Grid Computing set for big growth". Tanner, John, America's Network, vol. 107, No. 8, May 15, 2003, 6 pages.

Office Action, U.S. Appl. No. 12/125,892, Filed May 22, 2008, mailed Aug. 26, 2008.

Office Action, U.S. Appl. No. 12/125,879, Filed May 22, 2008, mailed Sep. 15, 2009.

Notice of Allowance, U.S. Appl. No. 12/194,898, Filed Aug. 20, 2008, mailed Sep. 30, 2009.

* cited by examiner

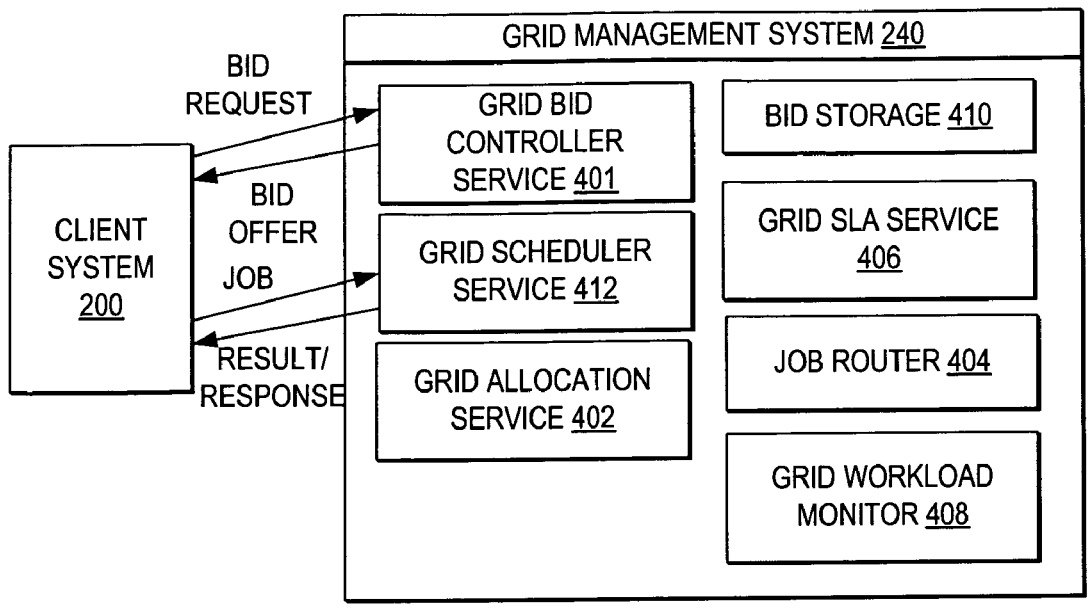
*Fig. 4*
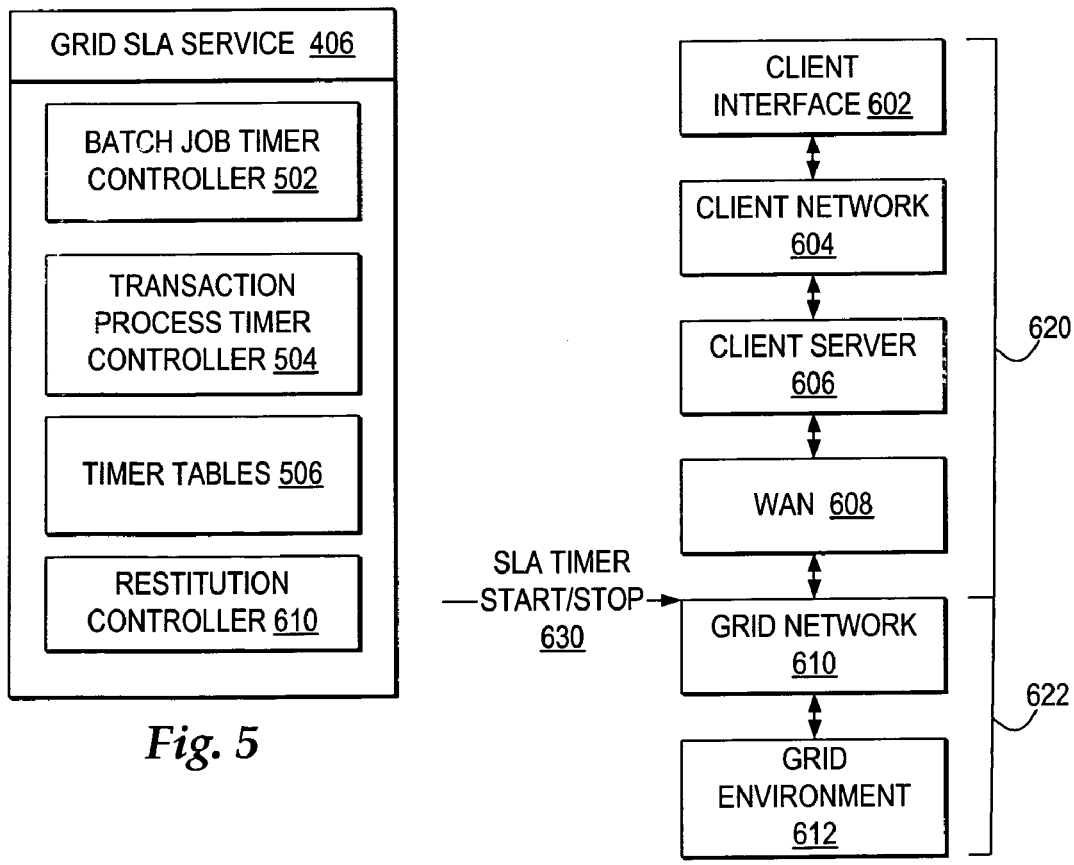
*Fig. 5*
*Fig. 6*

| TIMER TABLES 506 | | | |
|---|---|---|---|
| | SLA TARGET | CURRENT T | COMPLETION T | RECONCILATION CALCULATION |
| 702 BATCH A | 2:00:00 | 1:15:00 TOTAL | | |
| BATCH B | 4/15/2004 2:00:00 PM | 4/15/2004 1:30:00 PM | | |
| BATCH C | 10:00:00 TOTAL | | 10:20:00 TOTAL | SHORT 20 MIN-> $10.00 |
| BATCH D | 10:30:00 AM | | 11:00:00 AM | UNDER 30 MIN-> 30 CREDITS |
| | SLA GROUP | START TIME | COMPLETION TIME | |
| 704 TRANS 1 | A | 1:28:00 PM | | |
| TRANS 2 | A | 1:28:10 PM | | |
| TRANS 3 | A | 1:28:00 PM | 1:28:50 PM | |
| TRANS 4 | A | 1:28:15 PM | 1:29:05 PM | |
| | % GOAL | | ALL COMPLETE TIME | RECONCILIATION CALCULATION |
| GROUP A | 50% BY 1:30:00 PM | | 1:31:00 PM | |

*Fig. 7*

MANAGING COMPLIANCE WITH SERVICE LEVEL AGREEMENTS IN A GRID ENVIRONMENT

BACKGROUND OF THE INVENTION

1. Technical Field

The present invention relates in general to improved grid computing and, in particular, to managing and enforcing compliance with service level agreements in a grid environment. Still more particularly, the present invention relates to monitoring timely compliance of the grid environment with the service level agreement for processing a job and controlling restitution for non-compliance.

2. Description of the Related Art

Ever since the first connection was made between two computer systems, new ways of transferring data, resources, and other information between two computer systems via a connection continue to develop. In typical network architectures, when two computer systems are exchanging data via a connection, one of the computer systems is considered a client sending requests and the other is considered a server processing the requests and returning results. In an effort to increase the speed at which requests are handled, server systems continue to expand in size and speed. Further, in an effort to handle peak periods when multiple requests are arriving every second, server systems are often joined together as a group and requests are distributed among the grouped servers. Multiple methods of grouping servers have developed such as clustering, multi-system shared data (sysplex) environments, and enterprise systems. With a cluster of servers, one server is typically designated to manage distribution of incoming requests and outgoing responses. The other servers typically operate in parallel to handle the distributed requests from clients. Thus, one of multiple servers in a cluster may service a client request without the client detecting that a cluster of servers is processing the request.

Typically, servers or groups of servers operate on a particular network platform, such as Unix or some variation of Unix, and provide a hosting environment for running applications. Each network platform may provide functions ranging from database integration, clustering services, and security to workload management and problem determination. Each network platform typically offers different implementations, semantic behaviors, and application programming interfaces (APIs).

Merely grouping servers together to expand processing power, however, is a limited method of improving efficiency of response times in a network. Thus, increasingly, within a company network, rather than just grouping servers, servers and groups of server systems are organized as distributed resources. There is an increased effort to collaborate, share data, share cycles, and improve other modes of interaction among servers within a company network and outside the company network. Further, there is an increased effort to outsource nonessential elements from one company network to that of a service provider network. Moreover, there is a movement to coordinate resource sharing between resources that are not subject to the same management system, but still address issues of security, policy, payment, and membership. For example, resources on an individual's desktop are not typically subject to the same management system as resources of a company server cluster. Even different administrative groups within a company network may implement distinct management systems.

The problems with decentralizing the resources available from servers and other computing systems operating on different network platforms, located in different regions, with different security protocols and each controlled by a different management system, has led to the development of Grid technologies using open standards for operating a grid environment. Grid environments support the sharing and coordinated use of diverse resources in dynamic, distributed, virtual organizations. A virtual organization is created within a grid environment when a selection of resources, from geographically distributed systems operated by different organizations with differing policies and management systems, is organized to handle a job request.

While grid technologies solve some of the problems with decentralizing disparate computing systems to create a virtual organization of resources, grid technologies do not solve all the problems associated with decentralized resources. One of these problems left unsolved is how to monitor and enforce service level agreements (SLAs), which have become the norm in the computer industry, for designating the expected performance by information technology providers. Grid technology providers, also called grid vendors, make no guarantee except for "here is the environment that you asked for." This guarantee, however, is limited and does not take into account the timeliness required for some grid jobs. Further, this guarantee is limited because there is not a mechanism to detect whether the guarantee is met or to provide compensation to the customer if the guarantee is not met.

Therefore, in view of the foregoing, there is a need for a method, system, and program for managing and enforcing compliance with SLAs for grid jobs executing in a grid environment. In particular, there is a need for managing compliance with SLAs based on the timeliness required of a particular type of grid job. Further, there is a need for controlling restitution when a grid environment does not deliver the response or result of a grid job in compliance with the SLA.

SUMMARY OF THE INVENTION

In view of the foregoing, the invention in general provides for grid computing and to managing compliance with service level agreements in a grid environment. The invention relates to monitoring timely compliance of the grid environment with the service level agreement for a grid job and controlling restitution for non-compliance.

In one embodiment, a grid service for managing compliance with service level agreements in a grid environment detects a grid job passing a timing entry point, and flowing towards a grid environment provided by a grid vendor. When the grid job is detected passing the timing entry point, the grid service starts a timer to monitor an amount of time from the grid job passing the timing entry point until a result of the grid job passes a timing exit point while flowing away from the grid environment. When the grid service detects the result of the grid job passing the timing exit point, the grid service determines whether a value of the timer exceeds a timing term agreed to in a service level agreement specifying performance requirements for said grid job agreed to by said grid vendor, such that compliance with the service level agreement is automatically managed within the grid environment.

The grid jobs include a transaction processing type of job or a batch type of job. If the grid job is a transaction processing type of job, then the grid service accumulates the value of the timer for a series of grid jobs and determines whether the accumulated value exceeds the timing terms in the service level agreement. If the grid job is a batch type of job, then the grid service detects when the last result for the batch type of job passes the exit point and then stops the timer.

In addition, responsive to the value of the timer exceeding the timing term agreed to in the service level agreement, the grid service calculates a restitution fee to compensate a client submitting the grid job. Then, the grid service controls reconciliation with the client through the restitution fee.

If the value of the timer does not exceed the timing term agreed to in the service level agreement, then the grid service determines whether to award bonus credits. Bonus credits are transferred to the client sending the grid job to indicate the extra timeliness of the grid job execution or are accumulated by the grid vendor to determine which portions of the grid environment and which types of jobs run most efficiently.

BRIEF DESCRIPTION OF THE DRAWINGS

The novel features believed aspect of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a block diagram depicting a grid management system for handling grid jobs and tracking compliance of grid jobs to perform within SLA terms;

FIG. 5 is a block diagram depicting examples of components of a grid SLA service in accordance with the method, system, and program of the present invention;

FIG. 6 is a block diagram illustrating the position of timers for calculating grid job execution compliance with SLA terms in accordance with the method, system, and program of the present invention;

FIG. 7 is an illustrative example of entries in a timer table in accordance with the method, system, and program of the present invention;

DETAILED DESCRIPTION OF THE PREFERRED EMBODIMENT

Figure 1:
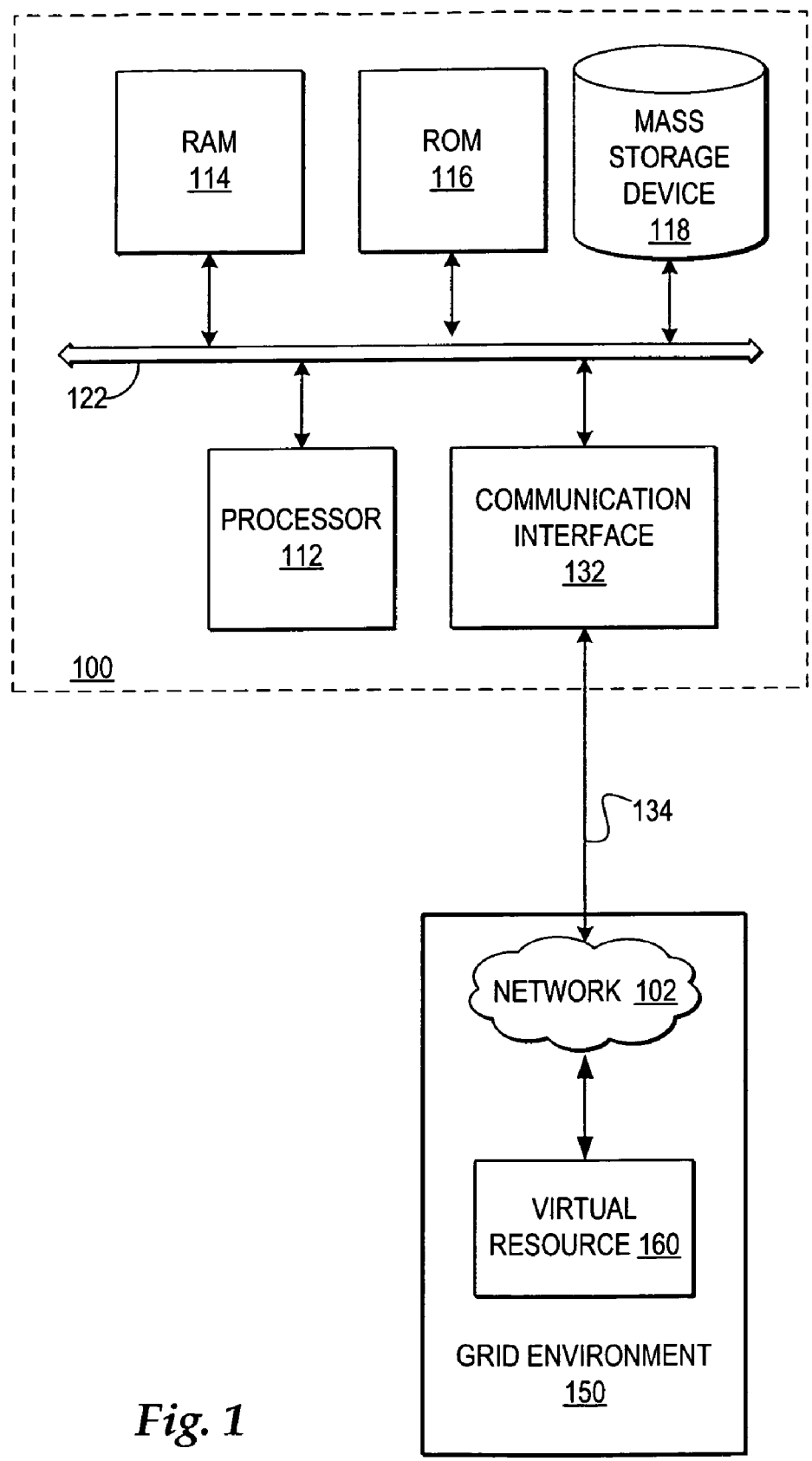
FIG. 1 depicts one embodiment of a computer system which may be implemented in a grid environment and in which the present invention may be implemented.

Referring now to the drawings and in particular to FIG. 1, there is depicted one embodiment of a computer system which may be implemented in a grid environment and in which the present invention may be implemented. As will be further described, the grid environment includes multiple computer systems managed to provide resources. Additionally, as will be further described, the present invention may be executed in a variety of computer systems, including a variety of computing systems, mobile systems, and electronic devices operating under a number of different operating systems managed within a grid environment.

In one embodiment, computer system 100 includes a bus 122 or other device for communicating information within computer system 100, and at least one processing device such as processor 112, coupled to bus 122 for processing information. Bus 122 may include low-latency and higher latency paths connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system may provide a graphical user interface (GUI) to the user. In one embodiment, application software contains machine executable instructions that when executed on processor 112 carry out the operations depicted in the flowcharts of FIGS. 8, 9, 10, and 11 and other operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote virtual resource, such as a virtual resource 160, to requesting computer system 100 by way of data signals embodied in a carrier wave or other propagation medium via a network link 134 (e.g. a modem or network connection) to a communications interface 132 coupled to bus 122. Virtual resource 160 may include a virtual representation of the resources accessible from a single system or systems, wherein multiple systems may each be considered discrete sets of resources operating on independent platforms, but coordinated as a virtual resource by a grid manager. Communications interface 132 provides a two-way data communications coupling to network link 134 that may be connected, for example, to a local area network (LAN), wide area network (WAN), or an Internet Service Provider (ISP) that provide access to network 102. In particular, network link 134 may provide wired and/or wireless network communications to one or more networks, such as network 102, through which use of virtual resources, such as virtual resource 160, is accessible as provided within a grid environment 150. Grid environment 150 may be part of multiple types of networks, including a peer-to-peer network, or may be part of a single computer system, such as computer system 100.

As one example, network 102 may refer to the worldwide collection of networks and gateways that use a particular protocol, such as Transmission Control Protocol (TCP) and Internet Protocol (IP), to communicate with one another. Network 102 uses electrical, electromagnetic, or optical signals that carry digital data streams. The signals through the various networks and the signals on network link 134 and through communication interface 132, which carry the digital data to and from computer system 100, are exemplary forms of carrier waves transporting the information. It will be understood that alternate types of networks, combinations of networks, and infrastructures of networks may be implemented.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

Additionally, although not depicted, multiple peripheral components and internal/external devices may be added to computer system 100, connected to multiple controllers, adapters, and expansion slots coupled to one of the multiple levels of bus 122. For example, a display device, audio device, keyboard, or cursor control device may be added as a peripheral component.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
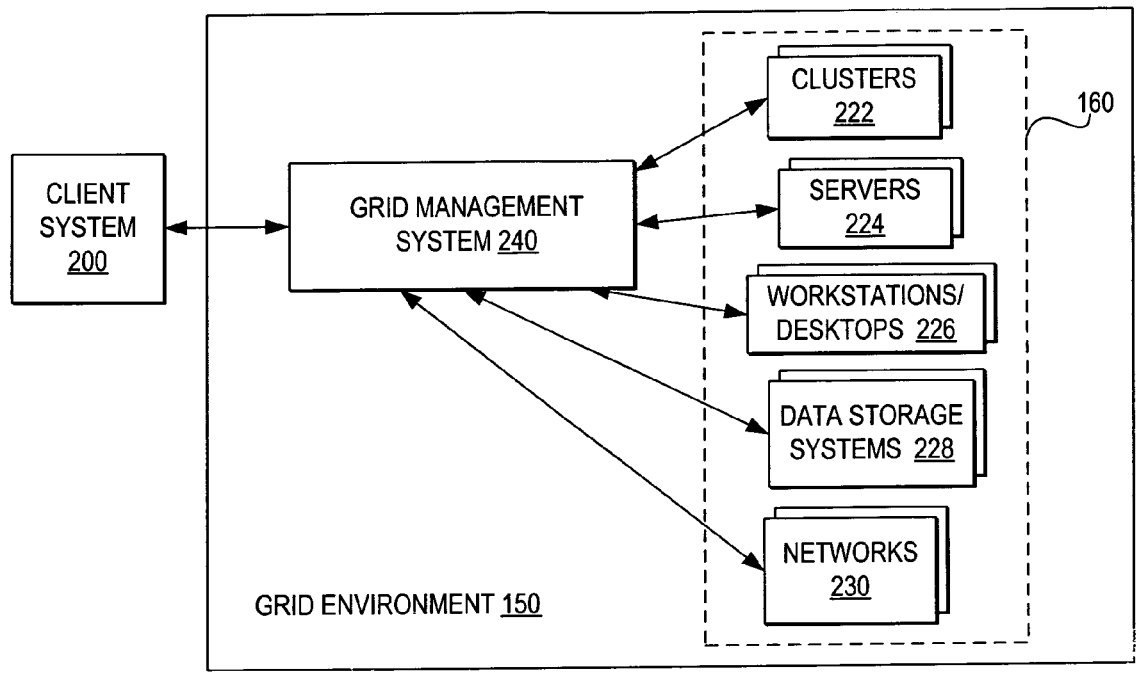
FIG. 2 is block diagram illustrating one embodiment of the general types of components within a grid environment.

With reference now to FIG. 2, a block diagram illustrates one embodiment of the general types of components within a grid environment. In the present example, the components of a grid environment 150 include a client system 200 interfacing with a grid management system 240 which interfaces with server clusters 222, servers 224, workstations and desktops 226, data storage systems 228, and networks 230. For purposes of illustration, the network locations and types of networks connecting the components within grid environment 150 are not depicted. It will be understood, however, that the components within grid environment 150 may reside atop a network infrastructure architecture that may be implemented with multiple types of networks overlapping one another. Network infrastructure may range from multiple large enterprise systems to a peer-to-peer system to a single computer system. Further, it will be understood that the components within grid environment 150 are merely representations of the types of components within a grid environment. A grid environment may simply be encompassed in a single computer system or may encompass multiple enterprises of systems. In addition, it will be understood that a grid vendor may provide grid environment 150, where the grid vendor may calculate a cost for use of resources within grid environment 150 based on the amount of time required for a grid job to execute or the actual amount of resources used, for example.

The central goal of a grid environment, such as grid environment 150 is organization and delivery of resources from multiple discrete systems viewed as virtual resource 160. Client system 200, server clusters 222, servers 224, workstations and desktops 226, data storage systems 228, networks 230 and the systems creating grid management system 240 may be heterogeneous and regionally distributed with independent management systems, but enabled to exchange information, resources, and services through a grid infrastructure enabled by grid management system 240. Further, server clusters 222, servers 224, workstations and desktops 226, data storage systems 228, and networks 230 may be geographically distributed across countries and continents or locally accessible to one another. It will be understood that mechanisms for discovery of grid resources within virtual resource 160 are not depicted herein, however, client system 200 may discover the resources within virtual resource 160 as advertised from local and global directories available within grid environment 150.

In the example, client system 200 interfaces with grid management system 240. Client system 200 may represent any computing system sending requests to grid management system 240. In particular, client system 200 may send virtual job requests and jobs to grid management system 240 and grid management system 240 may respond with a grid offer and controls processing of grid jobs. Further, while in the present embodiment client system 200 is depicted as accessing grid environment 150 with a request, in alternate embodiments client system 200 may also operate within grid environment 150.

While the systems within virtual resource 160 are depicted in parallel, in reality, the systems may be part of a hierarchy of systems where some systems within virtual resource 160 may be local to client system 200, while other systems require access to external networks. Additionally, it is important to note, that client system 200 may physically encompass the systems depicted within virtual resources 160. Further, the systems in virtual resource 160 may be allocated among resource nodes and execution environments, where a resource node is a grouping of resources enabled to perform a particular grid function and an execution environment is a grouping of resources and resource nodes enabled to handle a particular grid job.

To implement grid environment 150, grid management system 240 facilitates grid services. Grid services may be designed according to multiple architectures, including, but not limited to, the Open Grid Services Architecture (OGSA). In particular, grid management system 240 refers to the management environment which creates a grid by linking computing systems into a heterogeneous network environment characterized by the sharing of resources through grid services.

In one example, as will be further described in detail, grid management system 240 may include multiple grid services that, working together, enable monitoring of the execution of a grid job within grid environment 150 and analysis of whether an SLA for the grid job was met by the performance of grid environment 150. In addition, grid management system 240 may include multiple grid services that, working together, enable restitution if the performance of grid environment 150 does not comply with an SLA.

As described herein, a SLA may define multiple performance terms including, but not limited to, execution time, response time, costs, disk and network requirements, and other performance and workload requirements of a particular grid job or of grid jobs for a particular client. In addition, a SLA may define the terms for calculating a restitution fee should execution of the grid job not comply with the SLA terms and the SLA may define the terms for calculating bonuses should execution of the grid job comply with the SLA terms.

It is important to note that in one embodiment, a SLA is negotiated by an automated bid negotiation process provided by grid management system 240, however, in another embodiment, communication between the client and the provider of grid environment 150 may be facilitated to enable agreement upon the terms of a SLA.

Figure 3:
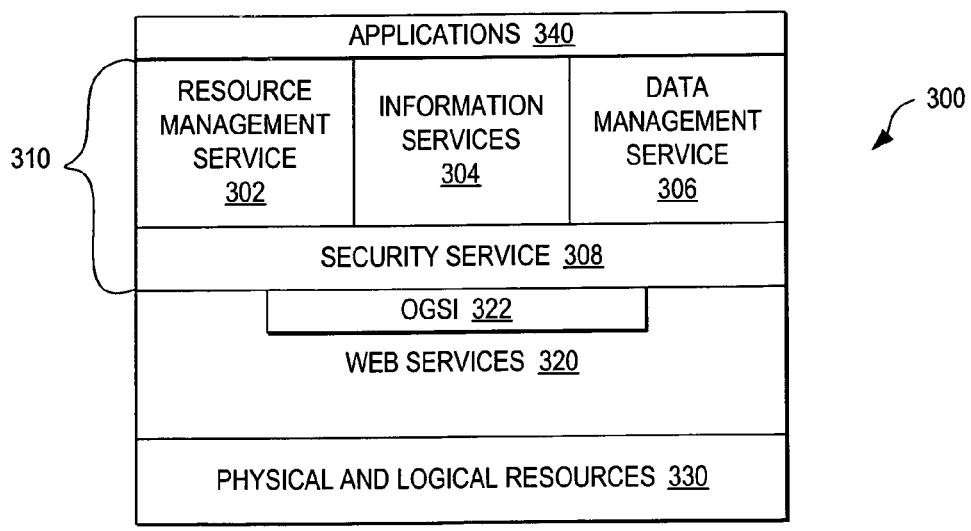
FIG. 3 is a block diagram depicting one example of an architecture that may be implemented in a grid environment.

Referring now to FIG. 3, a block diagram illustrates one example of an architecture that may be implemented in a grid environment. As depicted, an architecture 300 includes multiple layers of functionality. As will be further described, the present invention is a process which may be implemented in one or more layers of an architecture, such as architecture 300, which is implemented in a grid environment, such as the grid environment described in FIG. 2. It is important to note that architecture 300 is just one example of an architecture that may be implemented in a grid environment and in which the present invention may be implemented. Further, it is important to note that multiple architectures may be implemented within a grid environment.

Within the layers of architecture 300, first, a physical and logical resources layer 330 organizes the resources of the systems in the grid. Physical resources include, but are not limited to, servers, storage media, and networks. The logical resources virtualize and aggregate the physical layer into usable resources such as operating systems, processing power, memory, I/O processing, file systems, database managers, directories, memory managers, and other resources.

Next, a web services layer 320 provides an interface between grid services 310 and physical and logical resources 330. Web services layer 320 implements service interfaces including, but not limited to, Web Services Description Language (WSDL), Simple Object Access Protocol (SOAP), and eXtensible mark-up language (XML) executing atop an Internet Protocol (IP) or other network transport layer. Further, the Open Grid Services Infrastructure (OSGI) standard 322 builds on top of current web services 320 by extending web services 320 to provide capabilities for dynamic and manageable Web services required to model the resources of the grid. In particular, by implementing OGSI standard 322 with web services 320, grid services 310 designed using OGSA are interoperable. In alternate embodiments, other infrastructures or additional infrastructures may be implemented a top web services layer 320.

Grid services layer 310 includes multiple services which may be incorporated into grid management system 240. For example, grid services layer 310 may include grid services designed using OGSA, such that a uniform standard is implemented in creating grid services. Alternatively, grid services may be designed under multiple architectures. Grid services can be grouped into four main functions. It will be understood, however, that other functions may be performed by grid services.

First, a resource management service 302 manages the use of the physical and logical resources. Resources may include, but are not limited to, processing resources, memory resources, and storage resources. Management of these resources includes scheduling jobs, distributing jobs, and managing the retrieval of the results for jobs. Resource management service 302 monitors resource loads and distributes jobs to less busy parts of the grid to balance resource loads and absorb unexpected peaks of activity. In particular, a user may specify preferred performance levels so that resource management service 302 distributes jobs to maintain the preferred performance levels within the grid.

Second, information services 304 manages the information transfer and communication between computing systems within the grid. Since multiple communication protocols may be implemented, information services 304 manages communications across multiple networks utilizing multiple types of communication protocols.

Third, a data management service 306 manages data transfer and storage within the grid. In particular, data management service 306 may move data to nodes within the grid where a job requiring the data will execute. A particular type of transfer protocol, such as Grid File Transfer Protocol (GridFTP), may be implemented.

Finally, a security service 308 applies a security protocol for security at the connection layers of each of the systems operating within the grid. Security service 308 may implement security protocols, such as Open Secure Socket Layers (SSL), to provide secure transmissions. Further, security service 308 may provide a single sign-on mechanism, so that once a user is authenticated, a proxy certificate is created and used when performing actions within the grid for the user.

Multiple services may work together to provide several key functions of a grid computing system. In a first example, computational tasks are distributed within a grid. Data management service 306 may divide up a computation task into separate grid services requests of packets of data that are then distributed by and managed by resource management service 302. The results are collected and consolidated by data management system 306. In a second example, the storage resources across multiple computing systems in the grid are viewed as a single virtual data storage system managed by data management service 306 and monitored by resource management service 302.

An applications layer 340 includes applications that use one or more of the grid services available in grid services layer 310. Advantageously, applications interface with the physical and logical resources 330 via grid services layer 310 and web services 320, such that multiple heterogeneous systems can interact and interoperate.

With reference now to FIG. 4, there is depicted a block diagram of a grid management system for handling grid jobs and tracking compliance of grid jobs to perform within SLA terms. As depicted, client system 200 submits bid requests for grid jobs to a grid bid controller service 401. Grid bid controller server 401 receives the bid request, which may include workload and performance requirements, and accesses other grid services within grid management system 240 to determine whether grid environment 150 can handle the grid job described by the bid request and to price an offer to handle the grid job described by the bid request. U.S. patent applications Ser. Nos. 10/940,452 and 11/031,489, herein incorporated by reference, describe types of grid services that may estimate the workload requirement for a bid request and determine a price for the estimated workload. Alternatively, a system administrator may receive the bid request and determine whether grid environment 150 can handle the workload and performance requirements.

In addition, according to an advantage of the invention, the bid request may include SLA terms or may refer to an SLA already in place between the client and the grid vendor whose grid environment is managed by grid management system 240. Grid bid controller service 401 determines whether grid management system 240 can meet the SLA terms for the particular grid job. Further, grid bid controller service 401 may determine that grid management system 240 can only meet a portion of the SLA terms or can only meet adjusted SLA terms. Moreover, grid bid controller service 401 may analyze the performance requirements of a grid environment in the bid request and generate the terms of the SLA to comply with the performance requirements in the bid request.

Grid bid controller service 401 returns a bid offer to client system 200. The bid offer may specify a price to complete the bid request as requested. Alternatively, the bid offer may include exceptions, exclusions, additions, or other changes to handling the original bid request. For example, if grid bid controller server 401 determines that grid management system 240 cannot meet an SLA term in the bid request, but could meet the other SLA terms, then the bid offer may agree to the bid request with an exclusion or the bid offer may include a newly generated SLA.

Grid bid controller server 401 may store a copy of each bid request and the corresponding bid offer in a bid storage system 410. Bid storage system 410 is then accessible to grid scheduler service 412 when client system 200 sends the job associated with a previously stored bid request and bid offer. Grid scheduler service 412 notifies the other grid services when a grid job is received and coordinates the scheduling of resource allocation by a grid allocation server 402, job routing to the allocated resources by job router 404 and workload monitoring to determine the actual workload requirements of a grid job routed to a selection of grid resources by grid workload monitor 408.

Grid scheduler service 408 may also coordinate the collection and return of a result or response to a grid job. In one example, when grid scheduler service 408 receives a batch grid job, grid scheduler service 408 may accumulate all the results of the batch job and return the results to client system 200 or other systems. In another example, when grid scheduler service 408 receives a transaction processing grid job, grid scheduler service 408 may quickly return responses to client system 200.

According to an advantage of the invention, a grid SLA service 406 also monitors the flow of jobs and responses to and from grid environment 150. In particular, grid SLA service 406 starts timers according to the type of grid job and according to the terms of the SLA agreement, as will be further described. Grid SLA service 406 compares the time calculated for a grid job from the time the grid job passes an entry point to the grid environment to the time the grid job passes an exit point from the grid environment with the terms in the SLA for the grid job. If grid SLA service 406 detects non-compliance with any terms in the SLA, then grid SLA service 406 calculates and manages any necessary restitution to the grid client. In addition, if grid SLA service 406 detects compliance with all the terms in the SLA, then grid SLA service 406 may calculate and manage the distribution of bonus credits. In one example, a client may collect the bonus credits and compare the number of bonus credits received from different grid vendors to determine the most SLA compliant grid vendors. In another example, a grid vendor may collect bonus credits to determine which system administrators are managing the grid environment to facilitate SLA compliant grid jobs or determining which types of jobs are managed most efficiently in the grid environment.

Referring now to FIG. 5, there is depicted a block diagram of examples of components of a grid SLA service in accordance with the method, system, and program of the present invention. As depicted, grid SLA service 406 includes multiple timer controllers, including a batch job timer controller 502 and a transaction process timer controller 504. Batch job timer controller 502 controls timers for batch type jobs and transaction process timer controller 504 controls timers for transaction processing type jobs.

In one embodiment, a batch type job may include a large job or a group of jobs, typically not requiring human interaction for completion, with an SLA that may specify a particular completion time or a duration for the completion of all calculations, for example. For example, an SLA may be agreed to for a group of database processing jobs, where computations for all of the database processing jobs must complete within 1 hour and for each minute over that hour required to complete the database processing jobs, restitution of ten dollars is required. Other examples of batch type jobs submitted within a grid environment include, but are not limited to, a batch grid job requiring the analysis of geological survey data created during the search for oil or gas, a batch grid job requiring the analysis of gnomic data used for gene mapping, and a batch grid job requiring the analysis of data retrieved from radio telescopes. For each batch type grid job, an SLA would require that all calculations finish within a particular time period or else a penalty would be assessed.

In contrast, in one embodiment, transaction processing type jobs may require human interaction or time sensitive responses, so the SLAs for transaction processing based jobs may specify a percentage of transactions that must be completed in a particular amount of time or a cap time for completion of all transactions. The percentage and cap time may vary based on the time of day or particular day. For example, an SLA may be agreed to for all transaction processing of a particular type between 8 AM and 10 AM, where the timing terms require that each transaction be completed within a minute and that half of the transactions are completed by 9 AM. In another example, an SLA for the analysis of financial derivatives (e.g. a financial analyst enters a single analysis request for a specific client) may require that 90% of all financial derivative transaction be completed within a particular time period, such as 2 minutes, and that all financial derivative transactions must be completed by the close of the financial market that day. In yet another example, transaction processing based jobs may require the analysis of "what-if" analysis involving a large number of variables, such as insurance risk analysis or fingerprint searches. The SLA in these examples may designate the maximum allowable time for a percentage of the transactions to complete on a sliding scale, such as 60% of the transactions completed within one minute, 75% of the transactions completed within ninety seconds, 90% of the transactions completed within two minutes, and all transactions completed in less than 150 seconds.

In one example, batch job timer controller 502 starts a batch timer when a batch job is detected passing an entry point into the grid environment. The entry point is specified by agreement in the SLA. Then, when batch job timer controller 502 detects the results of all the grid jobs included in the batch job passing an exit point out of the grid environment, the batch timer is stopped and the time is compared with time terms of the SLA for the grid job. A batch timer may merely calculate the duration of a batch job, however, a batch timer may also calculate a start time and date and a stop time and date.

Timer tables 506 include the data collected for each timer started by batch job timer controller 502 or transaction process timer 504, as will be further described with reference to FIG. 7. Further, timer tables 506 may include the expected duration of a grid job or an expected completion time or date. Additionally, timer table 506 may indicate any restitution calculated for the grid job based on whether the grid job completion time meets SLA terms.

A reconciliation controller 510 controls the reconciliation process for grid job compliance with SLA terms. In particular, reconciliation controller 510 determines whether a response or result of a grid job is returned within the time period agreed to in an SLA for the grid job.

In one example, if the time taken for delivery of a response or result exceeds the terms agreed to in the SLA for the grid job, then reconciliation controller 510 calculates a restitution fee based on the fee established in the SLA. Where the client system submitting the grid job is external to the grid environment, then reconciliation controller 510 may control returning the actual dollar amount of the restitution fee to the client system. Where the client system is part of the grid environment, then reconciliation controller 510 may control crediting an internal account for the restitution fee.

Alternatively, in another example, if the time taken for delivery of a response or result is less than the terms agreed to in the SLA for the grid job, then restitution controller 510 calculates bonuses based on the bonus agreement in the SLA. Then, restitution controller 510 actually controls restitution of either the restitution fee or the calculated bonuses. For example, restitution controller 510 may make a payment to the client for the restitution fee or restitution controller 510 may credit an account for the client with the restitution fee.

With reference now to FIG. 6, there is depicted a block diagram illustrating the position of timers for calculating grid job execution compliance with SLA terms in accordance with the method, system, and program of the present invention. As depicted, the flow of data for the processing of a grid job includes multiple systems. It will be understood that the examples of systems in the flow of data may include alternate systems and may include alternate data flows.

For purposes of example, a client interface 602 is depicted that provides the interactive medium for a client to select to send a grid job and to receive the response from a grid job. Client interaction via client interface 602 is communicated via client network 604 to a client server system 606. Client server system 606 then interfaces with a wide area network (WAN) 608. WAN 608 provides network access to other networks via the Internet or other networking infrastructure. In particular, WAN 608 provides network access to a grid network 610. Grid network 610 may include, for example, the network interface for a grid vendor that supplies grid environment 612. Grid jobs are processed by a virtual organization of resources within grid environment 612, as previously described.

An SLA agreement may designate the position along the data path at which the grid vendor is responsible for time compliance in grid job execution. In one embodiment, the timeliness of the systems designated by reference numeral 620 is not included in the SLA agreement by a grid vendor. The grid vendor does include, however, a guarantee of the timeliness of grid network 610 and grid environment 612 to handle a grid job.

In the example, since the grid vendor has agreed to guarantee the timeliness of the grid job once the grid job reaches grid network 610, the SLA timer is set to start and stop at the edge of grid network 610, as depicted at reference numeral 630. It will be understood that an in an alternate example, the SLA timer may start at one location and stop at another. Further, it will be understood that multiple timers may be implemented along the data flow and that the client may also implement timers to determine whether SLA agreements are met.

Referring now to FIG. 7, there is depicted an illustrative example of entries in a timer table in accordance with the method, system, and program of the present invention. As depicted, a timer table 506 includes entries for multiple batch grid jobs, as depicted at reference numeral 702, and for multiple transaction processing grid jobs, as depicted at reference numeral 704.

In the examples, timer table 506 includes the SLA target time, retrieved from the SLA terms for the grid job. In one example, as depicted with reference to grid job "batch A", the SLA target time is a total duration of two hours, while in another example, as depicted with reference to grid job "batch B", the SLA target time is a completion time of "Apr. 15, 2004" at 2:00 pm. It will be understood that the SLA target time may include both a total duration and a completion time. Further, it will be understood that the SLA target time may include other time and performance based constraints.

In addition, in the examples, timer table 506 includes the current time detected on a timer for a grid job. In one example, as depicted with reference to grid job "batch A", the current time is merely the total time that a grid job has been executing, while in another example, as depicted with reference to grid job "batch B", the current time includes the date and the actual current time. It will be understood that batch job timer controller 502 may start timers that track job execution duration or track the current date and time, or both.

Timer table 506 also includes a completion time, where the completion time for each grid job. In one example, as depicted with reference to grid job "batch C", the completion time indicates the total duration of the grid job, before passing the exit point, while in another example, as depicted with reference to grid job "batch D", the completion time indicates the actual time at which the grid job completed and the duration. It will be understood that the completion time may include multiple types of time indicators tracked during In addition, timer table 506 includes a reconciliation calculation. The reconciliation calculation indicates may indicate a monetary calculation, a credit calculation, or other value that designates the restitution required for a grid job for non-compliance with an SLA or that designates the bonus accumulation for a grid job for compliance with an SLA. In one example, as depicted with reference to grid job "batch C", the reconciliation calculation is for non-compliance with the SLA terms and comes to a restitution fee of $10.00, while in another example, as depicted with reference to gird job "batch D", the reconciliation calculation for compliance with the SLA terms comes to 30 bonus points, where each bonus point represents a minute.

For transaction processing type jobs, timer table 506 shows the time per transaction, such as the current time for transactions 1, 2, and 3, and shows the accumulated time for multiple transactions in a transaction group A, where the transaction processing SLA terms may include a time limit per transaction, but may also include a time limit for a particular number of transactions and may include time requirements for a percentage of the transactions to be completed. In the example, transactions 1 and 2 are currently executing and transactions 3 and 4 have already completed. The SLA terms require that half of the transactions complete before 1:30 pm and that all the transactions are complete before 1:31 pm. Both transactions 3 and 4 finished before 1:30 pm, however, transactions 1 and 2 will need to finish before 1:31 pm to meet the SLA terms. A restitution fee could have been calculated if transactions 3 and 4 did not finish before 1:30 pm and may also be calculated if transactions 1 and 2 do not finish before 1:31 pm.

Figure 8:
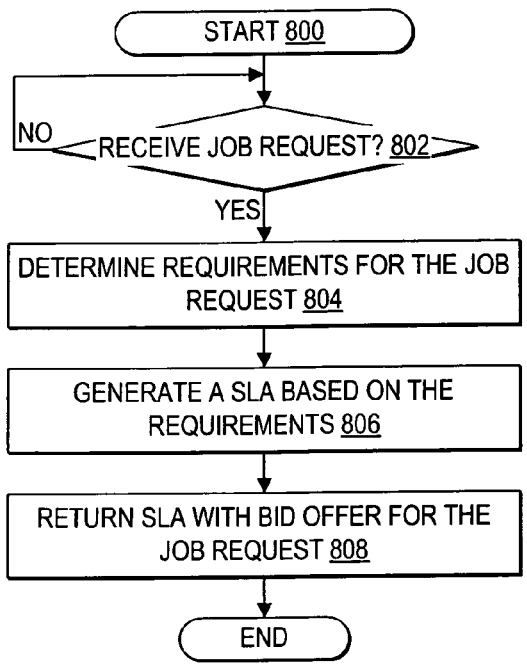
FIG. 8 is a high level logic flowchart depicting a process and program for generating service level agreements during a bid offer in accordance with the method, system, and program of the present invention.

With reference now to FIG. 8, there is depicted a high level logic flowchart of a process and program for generating service level agreements during a bid offer in accordance with the method, system, and program of the present invention. As depicted, the process starts at block 800, and thereafter proceeds to block 802. Block 802 depicts a determination whether a grid management system receives a grid job request. When a grid management system receives a grid job request, the process passes to block 804. Block 804 depicts determining the grid environment requirements for the job request. Next, block 806 depicts generating a SLA based on the grid environment requirements. Alternatively, the grid job request may include an SLA that is agreed to. Thereafter, block 808 depicts returning the SLA with the bid offer for the job request, and the process ends.

Figure 9:
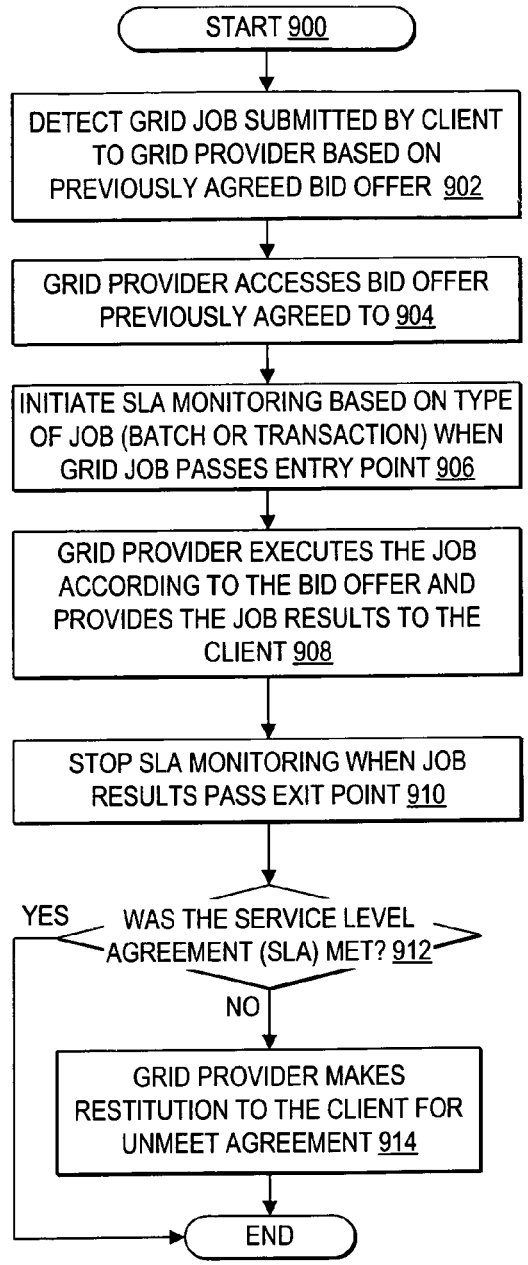
FIG. 9 is a high level logic flowchart depicting a process and program for generally managing job execution compliance to a service level agreement within a grid environment in accordance with the method, system, and program of the present invention.

Referring now to FIG. 9, there is depicted a high level logic flowchart of a process and program for generally managing job execution compliance to a service level agreement within a grid environment in accordance with the method, system, and program of the present invention. As illustrated, the process starts at block 900 and thereafter proceeds to block 902. Block 902 depicts receiving a grid job submitted by a client at a grid provider, where the grid job is based on a previously agreed to bid offer. Next, block 904 depicts the grid provider accessing the bid offer previously agreed to by the grid provider. Thereafter, block 906 depicts initiating SLA monitoring when the grid job passes an entry point for the grid vendor based on the type of grid job, where types of grid jobs include, but are not limited to, batch jobs and transaction process jobs, and the process passes to block 908.

Block 908 depicts the grid provider executing the grid job according to the bid offer and providing the job results to the client. Next, block 910 depicts stopping SLA monitoring when the job results pass the exit point. Thereafter, block 912 depicts a determination whether the SLA terms were met. If the SLA terms were met, then the process ends. If the SLA terms were not met, then the process passes to block 914 depicts a determination whether the terms of the SLA were met. If the terms of the SLA were not met, then the grid provider makes restitution for the unmet agreement requirements, and the process ends.

Figure 10:
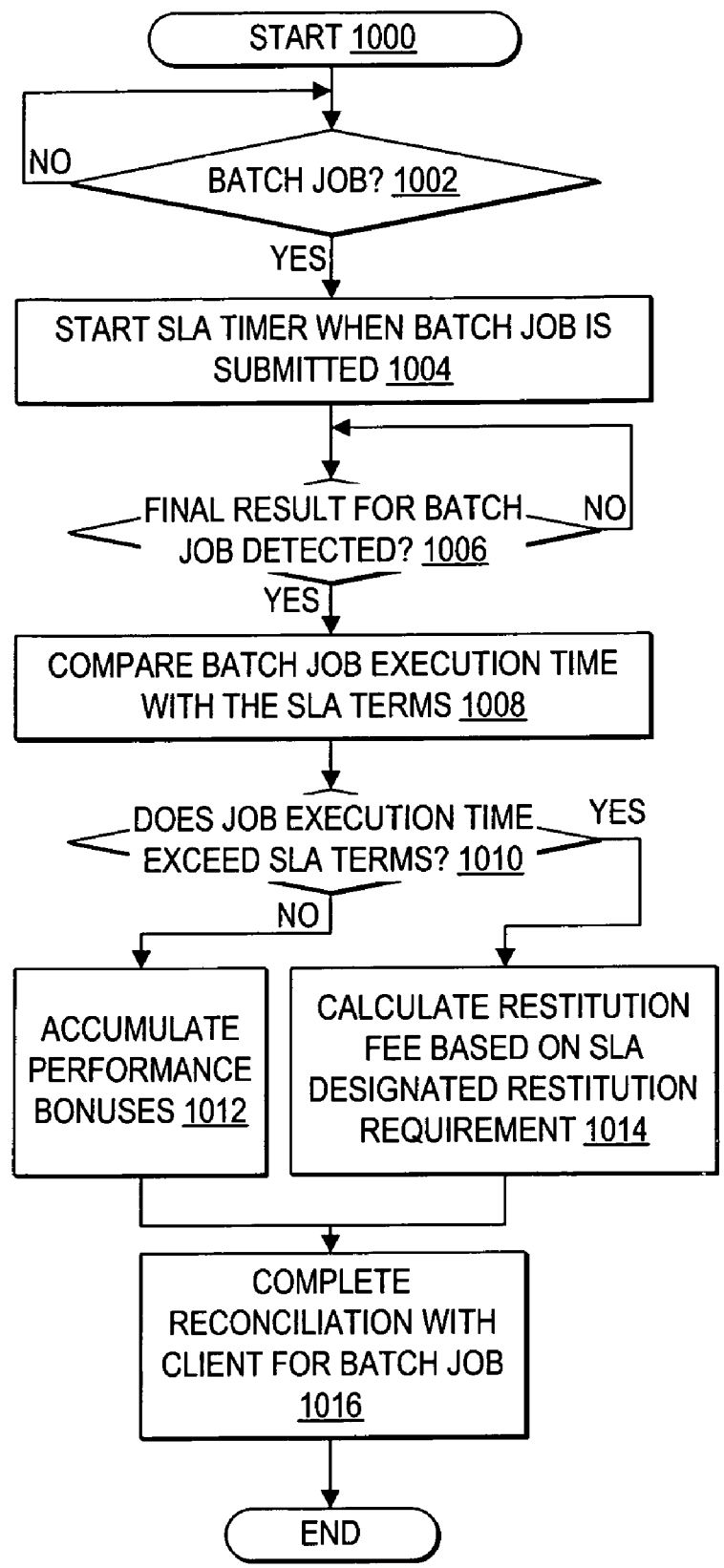
FIG. 10 is a high level logic flowchart depicting a process and program for monitoring the compliance of batch grid jobs with the terms of a SLA in accordance with the method, system, and program of the present invention.

With reference now to FIG. 10, there is depicted a high level logic flowchart of a process and program for monitoring the compliance of batch grid jobs with the terms of a SLA in accordance with the method, system, and program of the present invention. As depicted, the process starts at block 1000 and proceeds to block 1002. Block 1002 depicts a determination whether a request to monitor batch job compliance is received. When a request to monitor batch job compliance is received, then the process passes to block 104. Block 1004 depicts starting the SLA timer when the batch job is submitted. Next, block 1006 depicts a determination whether the final result for the batch job is detected. When the final result for the batch job is detected, the process passes to block 1008.

Block 1008 depicts comparing the batch job execution time with the SLA terms. Next, block 1010 depicts a determination whether the job execution time when the batch completed exceeded the SLA terms. At block 1010, if the job execution time did not exceed the SLA terms, then the process passes to block 1012. Block 1012 depicts accumulating performance bonuses for the portion of time by which the SLA terms exceed the batch job execution time, and the process passes to block 1016. Otherwise, at block 1010, if the batch job execution time exceeds the SLA terms, then the process passes to block 1014. Block 1014 depicts calculating a restitution fee based on the SLA designated restitution requirement, and the process passes to block 1016.

Block 1016 depicts completing the reconciliation with the client for the batch job, and the process ends. Where performance bonuses are accumulated, reconciliation may include updating the a performance status for the grid environment with the performance bonuses or updating an employee's performance rating for managing the grid environment with the performance bonuses, for example. Where restitution fees are calculated, the client may be compensated for the unmet portions of the SLA terms.

Figure 11:
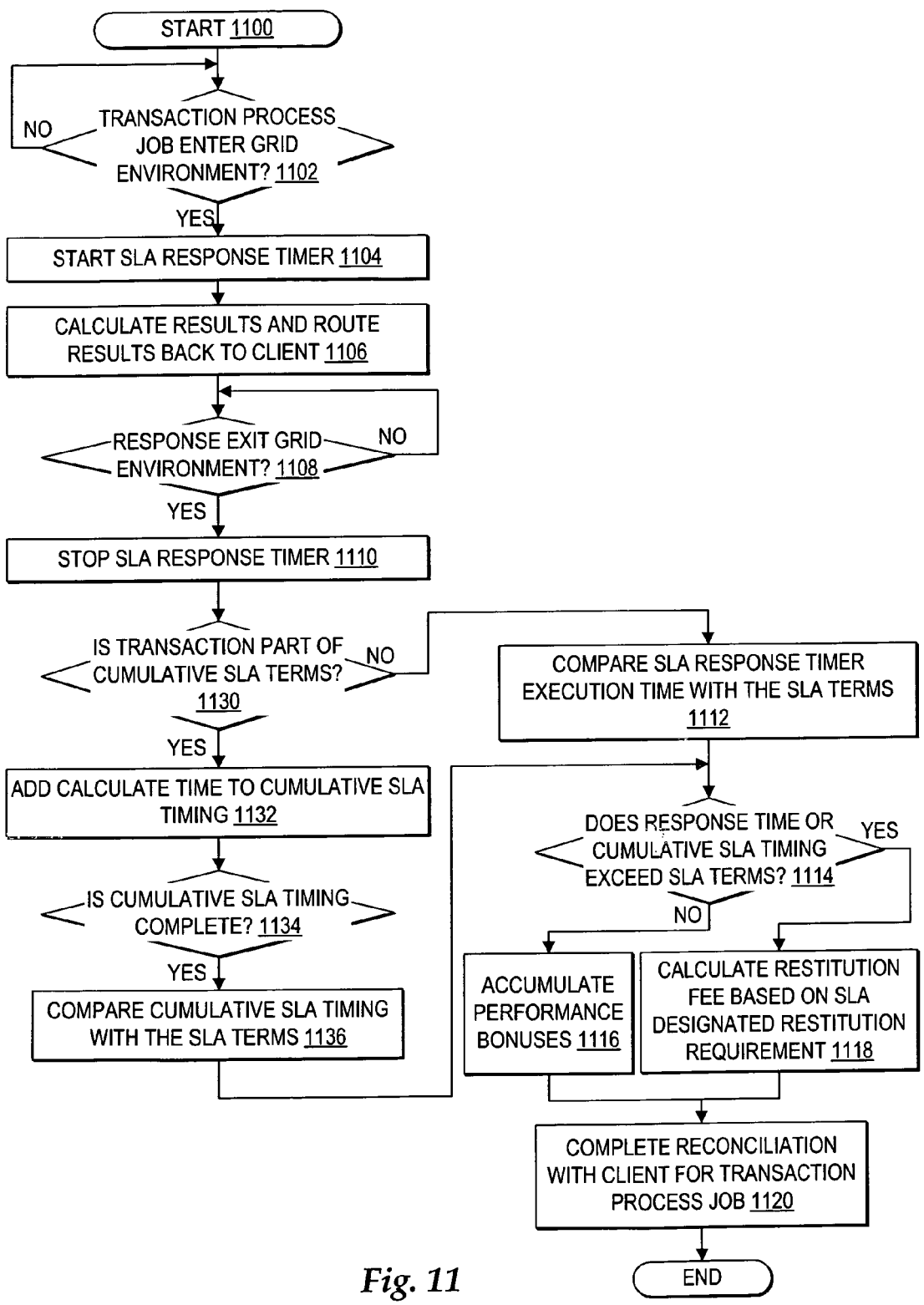
FIG. 11 is a high level logic flowchart depicting a process and program for monitoring the compliance of transaction process grid jobs with the terms of a SLA in accordance with the method, system, and program of the present invention.

Referring now to FIG. 11, there is depicted a high level logic flowchart of a process and program for monitoring the compliance of transaction process grid jobs with the terms of a SLA in accordance with the method, system, and program of the present invention. As depicted, the process starts at block 1100, and thereafter proceeds to block 1102. Block 1102 depicts a determination whether a transaction process grid job enters the grid environment. When a transaction process grid job enters the grid environment, then the process passes to block 1104. Block 1104 depicts starting the SLA response timer. Next, block 1106 depicts continuing to calculate the results and route the results back to the client. Thereafter, block 1008 depicts a determination whether a response exits the grid environment. If a response exits the grid environment, then the process passes to block 1110.

Block 1110 depicts stopping the SLA response timer. Next, block 1130 depicts a determination whether the transaction is part of a group of cumulative transactions with cumulative SLA terms. If the transaction is not part of a group of cumulative transactions, then the process passes to block 1112. Block 1112 depicts comparing the SLA response timer execution time with the SLA terms, and the process passes to block 1114. Otherwise, at block 1130, if the transaction is part of a group of cumulative transactions with cumulative SLA terms, then the process passes to block 1132. Block 1132 depicts adding the calculated response timer time to the cumulative SLA timing. Next, block 1134 depicts a determination whether the cumulative SLA timing is complete. If the cumulative SLA timing is not complete, then the process ends. If the cumulative SLA timing is complete, then the process passes to block 1114.

Block 1114 depicts a determination whether the response time or the cumulative SLA timing exceeds the SLA terms. If the response time or cumulative SLA timing exceeds the SLA timing terms, then the process passes to block 1118. Block 1118 depicts calculating a restitution fee based on the SLA designated restitution requirement, and the process passes to block 1120. Otherwise, at block 1114, if the response time or cumulative SLA timing does not exceed the SLA timing terms, then the process passes to block 1116. Block 1116 depicts accumulating performance bonuses for returning the response before the SLA timing terms, and the process passes to block 1120.

Block 1120 depicts completing the reconciliation with the client for the transaction process job, and the process ends. In particular, as previously described, reconciliation may include crediting payments to the client for the restitution fee and receiving credits from the client for accumulated performance bonuses.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for managing compliance with service level agreements in a grid environment, comprising:
providing, by a grid vendor, a grid environment comprising a plurality of computing systems each comprising at least one resource and each of said plurality of computing systems communicatively connected over a network through a grid management system to share each said at least one resource through a plurality of web services implemented within a web services layer extended by an open grid services infrastructure atop a grid service layer comprising at least one grid service implemented within an open grid services architecture;
detecting, by execution of said at least one grid service by at least one processor, a grid job from a client system passing a timing entry point flowing towards said grid environment provided by said grid vendor;
retrieving, by execution of said at least one grid service by at least one processor, a service level agreement for said grid job, in response to detecting said grid job passing said timing entry point flowing towards said grid environment;
detecting, by execution of said at least one grid service by at least one processor, whether said grid job comprises at least one of a batch type job comprising a grouping of a plurality of jobs not requiring human interaction for completion and with a timing term requirement of a set duration for completion of the said grouping of said plurality of jobs and a transaction type job requiring human interaction for each of a plurality of transactions with said timing term requirement specifying a percentage of said plurality of transactions to be completed in a particular amount of time and a total completion time for said plurality of transactions;
executing by said at least one grid service by said at least one processor, a timer to monitor an amount of time from said grid job passing said timing entry point to a result of said grid job passing a timing exit point while flowing away from said grid environment;
detecting, by execution of said at least one grid service by said at least one processor, said result of said grid job passing said timing exit point;
in response to detecting said grid job comprises a batch type job:
before stopping said timer, executing by execution of said at least one grid service by said at least one processor, a last result of said grouping of said plurality of jobs to pass said timing exit point;
determining, by execution of said at least one grid service by said at least one processor, whether a value of said timer exceeds said set duration; and
calculating, by execution of said at least one grid service by said at least one processor, a bonus credit for said grid vendor reflecting a difference between said value of said timer and said set duration, in response to detecting that said value of said timer is less than said set duration;
in response to detecting said grid job comprises a transaction type job:
in response to detecting a separate transaction result for each of said plurality of transactions passing said timing exit point, adding, by execution of said at least one grid service by said at least one processor, said value of said timer to a cumulative timer and storing said value of said timer as a separate total time per transaction for each separate transaction result;
determining, by execution of said at least one grid service by said at least one processor, based on each said separate total time per transaction and a number of said plurality of transactions whether said grid vendor meets said time term requirement of said percentage of said plurality of transactions completed in said particular amount of time and determining whether the value of the cumulative timer exceeds the total completion time; and
in response to detecting at least one of said grid vendor not exceeding said time term requirement of said percentage of said plurality of transactions completed in said particular amount of time and said cumulative time not exceeding the total completion time, calculating, by execution of said at least one grid service by said at least one processor, said bonus credit for said grid vendor;
distributing said bonus credit by said at least one grid service to said client system; and
collecting, by said client system, said bonus credit and a plurality of separate bonus credits received from a selection of a plurality of grid vendors each indicating compliance with said service level agreement to detect said selection of said plurality of grid vendors operating in compliance with said service level agreement.

2. The computer-implemented method according to claim 1 for managing compliance with service level agreements in a grid environment, further comprising:
calculating, by said at least one grid service, a restitution fee to compensate said client system submitting said grid job, in response to said value of said timer exceeding said timing term agreed to in said service level agreement; and
controlling, by said at least one grid service, reconciliation with said client system through said restitution fee.

3. The computer-implemented method according to claim 2 for managing compliance with service level agreements in a grid environment, wherein controlling reconciliation with said client through said restitution fee further comprises:
directing, by said at least one grid service, a payment to said client system for said restitution fee.

4. The computer-implemented method according to claim 2 for managing compliance with service level agreements in a grid environment, wherein controlling reconciliation with said client through said restitution fee further comprises:
crediting, by said at least one grid service, an internal account for said client system with said restitution fee, wherein said client system submits said grid job from within said grid environment.

5. The computer-implemented method according to claim 1 for managing compliance with service level agreements in a grid environment, further comprising:
receiving, by said at least one grid service, a bid request for said grid job from said client system, wherein said bid request specifies said performance requirements;
determining, by said at least one grid service, whether said grid environment can handle said performance requirements; and
returning, by said at least one grid service, a bid offer to said client system to handle said grid job in compliance with said performance requirements, in response to a determination that said grid environment can handle said performance requirements.

6. A system for managing compliance with service level agreements in a grid environment, comprising:

a grid service enabled to monitor a grid environment provided by a grid vendor, wherein said grid environment comprises a plurality of computing systems each comprising at least one resource comprising at least one processor and at least one memory and each of said plurality of computing systems communicatively connected over a network through a grid management system to share each said at least one resource through a plurality of web services implemented within a web services layer extended by an open grid services infrastructure atop a grid service layer comprising at least one grid service implemented within an open grid services architecture;

said grid service executing the following on at least one processor:

means for detecting said grid job from a client system pass a timing entry point flowing towards said grid environment;

means for retrieving a service level agreement for said grid job, in response to detecting said grid job passing said timing entry point flowing towards said grid environment;

means for detecting whether said grid job comprises at least one of a batch type job comprising a grouping of a plurality of jobs not requiring human interaction for completion and with a timing term requirement of a set duration for completion of the said grouping of said plurality of jobs and a transaction type job requiring human interaction for each of a plurality of transactions with said timing term requirement specifying a percentage of said plurality of transactions to be completed in a particular amount of time and a total completion time for said plurality of transactions;

means for executing a timer to monitor an amount of time from said grid job passing said timing entry point to a result of said grid job passing a timing exit point while flowing away from said grid environment;

means for detecting said result of said grid job pass said timing exit point;

in response to detecting said grid job comprises a batch type job:

means before stopping said timer, for executing a last result of said grouping of said plurality of jobs to pass said timing exit point;

means for determining whether a value of said timer exceeds said set duration; and means for calculating a bonus credit for said grid vendor reflecting a difference between said value of said timer and said set duration, in response to detecting that said value of said timer is less than said set duration;

in response to detecting said grid job comprises a transaction type job:

means, in response to detecting a separate transaction result for each of said plurality of transactions passing said timing exit point, for adding, by execution of said at least one grid service by said at least one processor, said value of said timer to a cumulative timer and storing said value of said timer as a separate total time per transaction for each separate transaction result;

means for determining based on each said separate total time per transaction and a number of said plurality of transactions whether said grid vendor meets said time term requirement of said percentage of said plurality of transactions completed in said particular amount of time and determining whether the value of the cumulative timer exceeds the total completion time; and means, in response to detecting at least one of said grid vendor not exceeding said time term requirement of said percentage of said plurality of transactions completed in said particular amount of time and said cumulative time not exceeding the total completion time, for calculating said bonus credit for said grid vendor;

means for calculating a bonus credit for said grid vendor reflecting a difference between said value of said timer and said timing term, in response to detecting that said value of said timer is less than said timing term; and means for distributing said bonus credit to said client system;

said client system comprising means for collecting said bonus credit with a plurality of separate bonus credits received from a selection of a plurality of grid vendors each indicating compliance with said service level agreement to detect said selection of said plurality of grid vendors operating in compliance with said service level agreement.

7. The system according to claim 6 for managing compliance with service level agreements in a grid environment, said grid service further comprising:

means for calculating a restitution fee to compensate said client system submitting said grid job, in response to said value of said timer exceeding said timing term agreed to in said service level agreement; and means for controlling reconciliation with said client system through said restitution fee.

8. The system according to claim 7 for managing compliance with service level agreements in a grid environment, wherein said means for controlling reconciliation with said client system through said restitution fee further comprises:

means for directing a payment to said client system for said restitution fee.

9. The system according to claim 7 for managing compliance with service level agreements in a grid environment, wherein said means for controlling reconciliation with said client system through said restitution fee further comprises:

means for crediting an internal account for said client system with said restitution fee, wherein said client system submits said grid job from within said grid environment.

10. The system according to claim 6 for managing compliance with service level agreements in a grid environment, said grid service further comprising:

means for receiving a bid request for said grid job from a client, wherein said bid request specifies said performance requirements;

means for determining whether said grid environment can handle said performance requirements; and means for returning a bid offer to said client system to handle said grid job in compliance with said performance requirements, in response to a determination that said grid environment can handle said performance requirements.

11. A computer executable program product comprising computer executable instructions tangibly embodied on a computer readable medium that when executed by said computer perform the method steps for managing compliance with service level agreements in a grid environment, comprising:

providing, by a grid vendor, a grid environment comprising a plurality of computing systems each comprising at least one resource and each of said plurality of computing systems communicatively connected over a network through a grid management system to share each said at least one resource through a plurality of web services implemented within a web services layer extended by an open grid services infrastructure atop a grid service layer comprising at least one grid service implemented within an open grid services architecture;

enabling detection of a grid job from a client system passing a timing entry point flowing towards a grid environment;

retrieving a service level agreement for said grid job, in response to detecting said grid job passing said timing entry point flowing towards said grid environment;

detecting whether said grid job comprises at least one of a batch type job comprising a grouping of a plurality of jobs not requiring human interaction for completion and with a timing term requirement of a set duration for completion of the said grouping of said plurality of jobs and a transaction type job requiring human interaction for each of a plurality of transactions with said timing term requirement specifying a percentage of said plurality of transactions to be completed in a particular amount of time and a total completion time for said plurality of transactions;

triggering a timer to monitor an amount of time from said grid job passing said timing entry point to a result of said grid job passing a timing exit point while flowing away from said grid environment;

enabling detection of said result of said grid job passing said timing exit point; and in response to detecting said grid job comprises a batch type job:

before stopping said timer, executing a last result of said grouping of said plurality of jobs to pass said timing exit point;

controlling a determination of whether a value of said timer exceeds said set duration; and calculating a bonus credit for said grid vendor reflecting a difference between said value of said timer and said set duration, in response to detecting that said value of said timer is less than said set duration;

in response to detecting said grid job comprises a transaction type job:

in response to detecting a separate transaction result for each of said plurality of transactions passing said timing exit point, adding said value of said timer to a cumulative timer and storing said value of said timer as a separate total time per transaction for each separate transaction result;

determining based on each said separate total time per transaction and a number of said plurality of transactions whether said grid vendor meets said time term requirement of said percentage of said plurality of transactions completed in said particular amount of time and determining whether the value of the cumulative timer exceeds the total completion time; and in response to detecting at least one of said grid vendor not exceeding said time term requirement of said percentage of said plurality of transactions completed in said particular amount of time and said cumulative time not exceeding the total completion time, calculating said bonus credit for said grid vendor;

distributing said bonus credit by said at least one grid service to said client system, wherein said client system collects said bonus credit with a plurality of separate bonus credits received from a selection of a plurality of grid vendors each indicating compliance with said service level agreement to detect said selection of said plurality of grid vendors operating in compliance with said service level agreement.

12. The computer program product according to claim 11 for managing compliance with service level agreements in a grid environment, further comprising:

means for calculating a restitution fee to compensate said client system submitting said grid job, in response to detecting that said value of said timer exceeds said timing term agreed to in said service level agreement; and means for controlling a reconciliation with said client system through said restitution fee.

13. The computer program product according to claim 12 for managing compliance with service level agreements in a grid environment, wherein said means for controlling a reconciliation with said client system through said restitution fee further comprises:

means for controlling distribution of a payment to said client system for said restitution fee.

14. The computer program product according to claim 7 for managing compliance with service level agreements in a grid environment, wherein said means for controlling a reconciliation with said client system through said restitution fee further comprises:

means for controlling a crediting of an internal account for said client system with said restitution fee, wherein said client system submits said grid job from said grid environment.

15. The computer program product according to claim 11 for managing compliance with service level agreements in a grid environment, further comprising:

means for enabling receipt of a bid request for said grid job from said client system, wherein said bid request specifies said performance requirements;

means for controlling a determination of whether said grid environment can handle said performance requirements; and means for controlling distribution of a bid offer to said client to handle said grid job in compliance with said performance requirements, in response to a determination that said grid environment can handle said performance requirements.

* * * * *

UNITED STATES PATENT AND TRADEMARK OFFICE
CERTIFICATE OF CORRECTION

PATENT NO. : 7,668,741 B2 Page 1 of 1
APPLICATION NO. : 11/031403
DATED : February 23, 2010
INVENTOR(S) : Ernest et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1170 days.

Signed and Sealed this

Twenty-eighth Day of December, 2010

David J. Kappos
*Director of the United States Patent and Trademark Office*